US009623885B1

(12) United States Patent
Shubs, Jr. et al.

(10) Patent No.: US 9,623,885 B1
(45) Date of Patent: Apr. 18, 2017

(54) RAILROAD MANAGEMENT SYSTEM HAVING DATA SOURCE INTEGRATION

(71) Applicant: Electro-Motive Diesel, Inc., LaGrange, IL (US)

(72) Inventors: Alexander Shubs, Jr., Chicago, IL (US); James David Seaton, Westmont, IL (US); David Matthew Roenspies, Elbum, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/959,915

(22) Filed: Dec. 4, 2015

(51) Int. Cl.
| | | |
|---|---|---|
| G05D 1/00 | (2006.01) |
| B61L 27/00 | (2006.01) |
| B61L 15/00 | (2006.01) |
| B61L 25/02 | (2006.01) |

(52) U.S. Cl.
CPC ......... *B61L 27/0011* (2013.01); *B61L 15/009* (2013.01); *B61L 15/0018* (2013.01); *B61L 25/02* (2013.01)

(58) Field of Classification Search
CPC .... B61C 13/00; B61L 27/0011; B61L 15/009; B61L 15/0018; B61L 25/02
USPC ............................. 701/2, 19; 246/167 R, 208
See application file for complete search history.

(56) References Cited

U.S. PATENT DOCUMENTS

| | | | |
|---|---|---|---|
| 8,676,721 B2 | 3/2014 | Piovesan et al. | |
| 8,682,513 B2 | 3/2014 | Chen et al. | |
| 8,869,256 B2 | 10/2014 | Sample et al. | |
| 2005/0171661 A1* | 8/2005 | Abdel-Malek | ...... B61L 27/0094 701/31.4 |
| 2008/0235041 A1 | 9/2008 | Cashdollar et al. | |
| 2015/0142384 A1 | 5/2015 | Chao et al. | |

* cited by examiner

*Primary Examiner* — Gertrude Arthur Jeanglaud
(74) *Attorney, Agent, or Firm* — Finnegan, Henderson, Farabow, Garrett & Dunner, LLP

(57) ABSTRACT

A railroad management system is disclosed. The railroad management system may include a display device configured to display information to an operator and a controller in electronic communication with the display device. The controller may include a train control module configured to receive input data from one or more train control systems and a business systems module configured to receive input data from one or more railroad data management systems. The controller may also include an integration module configured to identify discrepancies among the input data from the one or more train control systems and the railroad data management systems and generate corrected input data based on the input data from the one or more train control systems and the railroad data management systems. The controller may be configured to display one or more graphical user interfaces on the display device based at least in part on the corrected input data.

20 Claims, 3 Drawing Sheets

RAILROAD MANAGEMENT SYSTEM HAVING DATA SOURCE INTEGRATION

TECHNICAL FIELD

The present disclosure relates to a management system, and more particularly, to a railroad management system having data source integration.

BACKGROUND

Managing railroad networks often involves coordinating and/or controlling the operations of several trains and their associated rolling stock assets with respect to a number of internal and external variables. For example, railroad managers may coordinate a train's delivery schedule with the delivery schedules of other trains, track maintenance schedules, locomotive maintenance schedules, rail yard capacities, plant and/or mine schedules etc. Railroad managers and train operators may control each train on the network according to a strategy that allows the mission of each train to be completed successfully, on time, and with optimum efficiency. To facilitate this control, communication networks have been implemented that provide managers and operators with large amounts of information from several data sources to allow them to make well-informed operational decisions and strategies.

For example, managers and operators may be provided with location information of trains and assets on the railroad network, performance data of each train asset, maintenance and fault code information, track condition information, track signaling information, scheduling information, and/or other information during operation. Each type of information can be generated by a different data source, and, at times, the same information can be provided by multiple data sources. But when the same information is provided by multiple data sources, discrepancies in the source data may exist that can result in managers and operators being provided with inaccurate information. Further, when certain information is unavailable from all data sources, managers and operators may be required to make decisions without being fully informed of operational circumstances. The same concerns may also exist when information supplied from the data sources is used as inputs for automatic train or asset control systems.

One system for aggregating machine data from multiple inputs is disclosed in U.S. Pat. No. 8,676,72 (the '721 patent) to Piovesan et al., that issued on Mar. 18, 2014. In particular, the '721 patent describes a system for receiving data from multiple sensors on an offshore oil rig via an aggregator. The aggregator separates and correlates information from the multiple sensors and supplies the aggregated data to a data analysis engine. The data analysis engine looks for undiscovered relationships between streams of the incoming data and compares the data to benchmark data provided by a third party (e.g., nominal manufacturer data). The data analysis engine uses self-organizing maps to create optimized performance parameters, such as thresholds, alarms, and alerts that correspond to the discovered relationships in the data that were not known to the operator of the equipment. Data from the self-organized maps is shown to the user via a dashboard or web-based user interface.

While the system of the '721 patent may aggregate and correlate data to discover previously unknown relationships, it may not be optimum. In particular, the system of the '721 patent may be limited to receiving data from sensors located on an oil rig. That is, the system of the '721 patent may be limited to collecting and analyzing operational data of a rig and its internal equipment. Further, the system of the '721 patent may be limited to providing a retrospective view of key performance indicators of a drilling operation to its operators for the purpose of assessing the production levels and efficiency of the drilling operation, which may not be applicable to the operation of a railroad network.

The disclosed management system is directed to overcoming one or more of the problems set forth above and/or other problems of the prior art.

SUMMARY OF THE INVENTION

In one aspect, the present disclosure is directed to a railroad management system. The railroad management system may include a display device configured to display information to an operator and a controller in electronic communication with the display device. The controller may include a train control module configured to receive input data from one or more train control systems and generate command signals for controlling operations of a train based on the input data from the one or more train control systems. The controller may also include a business systems module configured to receive input data from one or more railroad data management systems. The controller may also include an integration module configured to identify discrepancies among the input data from the one or more train control systems and the railroad data management systems and generate corrected input data based on the input data from the one or more train control systems and the railroad data management systems. The controller may be configured to display one or more graphical user interfaces on the display device based at least in part on the corrected input data.

In another aspect the present disclosure is directed to a method of managing a railroad network. The method may include receiving input data from one or more train control systems, receiving input data from one or more railroad data management systems, and identifying discrepancies among the input data from the one or more train control systems and the railroad data management systems. The method may also include generating corrected input data based on the input data from the one or more train control systems and the railroad data management systems and displaying one or more graphical user interfaces on a display device based at least in part on the corrected input data.

In yet another aspect, the present disclosure is directed to a railroad management system. The railroad management system may include a display device configured to display information to an operator and a controller in electronic communication with the display device. The controller may include a train control module configured to receive input data from one or more train control systems and generate command signals for controlling operations of a train based on the input data from the one or more train control systems. The controller may also include a business systems module configured to receive input data from one or more railroad data management systems. The controller may also include an integration module configured to identify common pieces of data received by a plurality of different train control systems or railroad data management systems, identify discrepancies among the common pieces of data based on a comparison of the common pieces of data, and select one of the common pieces of data or combine the common pieces of data to generate corrected input data. The controller may be configured to display one or mom graphical user interfaces on the display device based at least in part on the corrected input data.

DETAILED DESCRIPTION

Figure 1:
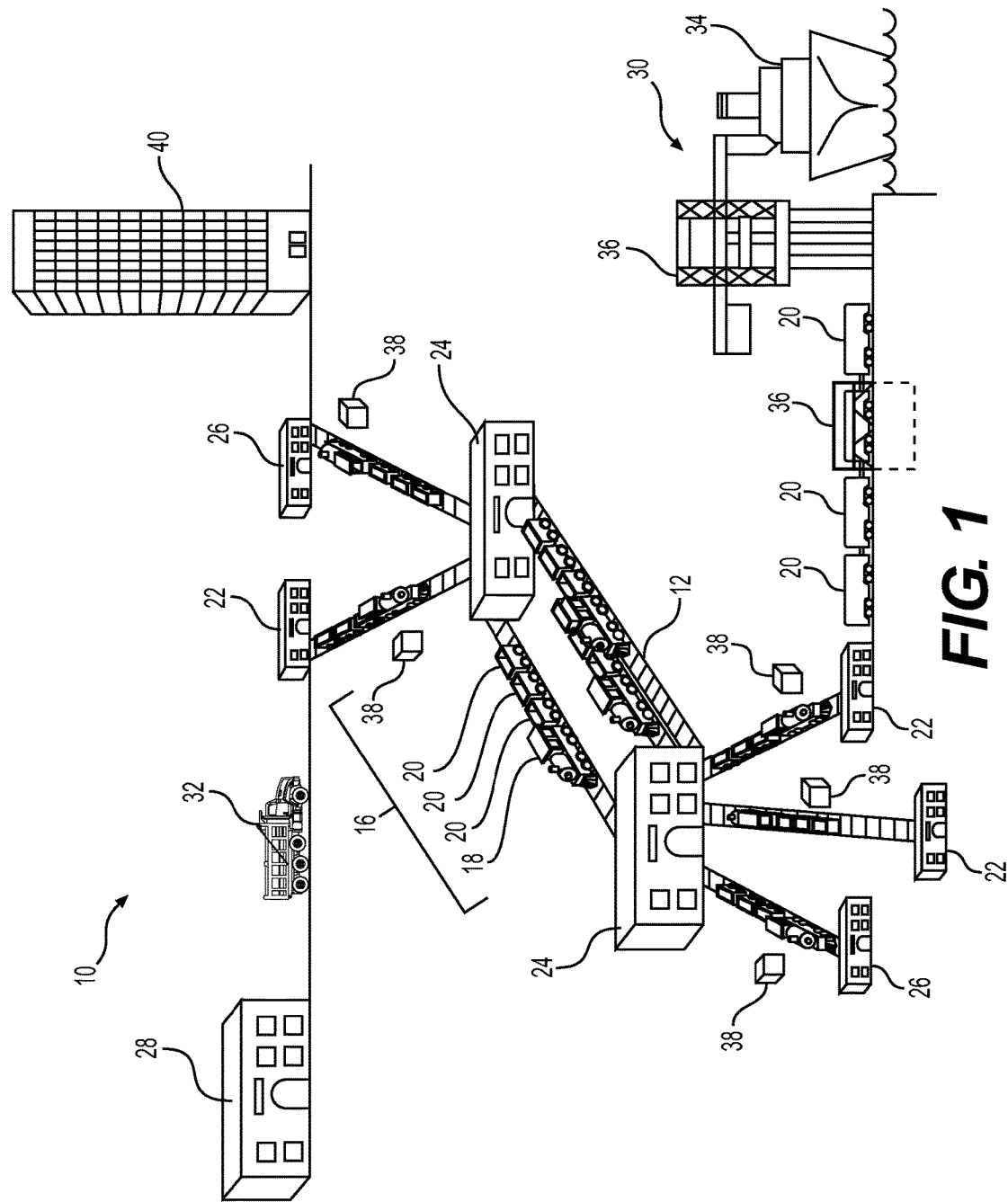
FIG. 1 is a pictorial illustration of an exemplary disclosed railroad network.

FIG. 1 pictorially illustrates an exemplary railroad network 10 having a system of tracks 12 on which one or more trains 14 may travel to transport payload materials, such as coal, metal ores, stone, other raw materials, and/or any other type of good or material. Trains 14 may carry the payload via one or more linked rolling stock assets ("assets") 16, such as locomotives 18, wagons 20, tankers, well cars, box cars, hopper cars, etc. In other embodiments, railroad network 10 may include a travel route between cities, and assess 16 may include rail vehicles for moving passengers and their cargo, such as coaches, baggage cars, and/or other types of rolling stock.

Railroad network 10 may include a number of locations, such as yards 22, depots 24, stations 26, and/or other facilities where various railroad operations are conducted. For instance, at each yard 22, trains 14 and assets 16 may be maneuvered according to yard rules to facilitate switching operations, train building operations, and certain industrial services. Each yard 22 may be located near a mine site, a station 26, a factory 28, a port 30, or another industrial site and may include facilities for staging and/or transferring payload materials into or out of wagons 20. At each yard 22, trains 14 may deliver or pickup payload material according to a yard schedule. Other transport vehicles, such as tracks 32 (only one shown) and marine vessels 34 (only one shown), may travel to each yard 22 according to a delivery schedule to haul away or deliver more payload material. Assets 16 of a train 14 may take turns being loaded or unloaded at each yard 22 via transfer equipment 36, such as an automated loading or dumping systems, which may be controlled by supervisory control and data acquisition (SCADA) systems.

Depots 24 may be positioned throughout railroad network 10 (including at yards 22) to facilitate asset maintenance, inspection, and repair. Assets 16 may be brought to depots 24 according to regular maintenance schedules or when unexpected repairs are needed, such as after a road failure. Depots 24 may keep and maintain inventories of spare parts, tools, shop supplies, fuels, and or other goods to facilitate repair and maintenance of a plurality of different types of assets.

Devices, such as wayside equipment 38, may be positioned throughout railroad network 10 and configured to collect and display information about various railroad operations. For instance, wayside equipment 38 may include sensors and otter devices that are configured to detect information pertaining to asset maintenance (e.g., asset operating parameters and usage), track maintenance (e.g., track usage), route signaling and interlocking (e.g., presence, speed, and/or location of trains and assets), and or other railroad operations. Based on this and other data, wayside equipment 38 may be configured to generate signals for railroad operators indicative of route permissions, speed limits, and or other information. Signals may be displayed in various ways, including by wayside signaling devices (e.g., lights) and through automatic train protection (ATP) systems accessible from onboard trains 14.

Other aspects of railroad operations, such as business planning and management, resource planning, logistical analysis, financial forecasting, etc., may be conducted at a management office 40 or other facility. Railroad managers may observe, among other things, market conditions, customer trends, supply chain details, weather conditions, and the operations at each location of railroad network 10 and determine ways in which railroad operations can be improved to increase efficiency, reduce downtime, and reduce operational costs. Based on these observations and planning efforts, railroad schedules and operational strategies may be developed and implemented for controlling trains 14 to achieve mission goals and performance targets.

Figure 2:
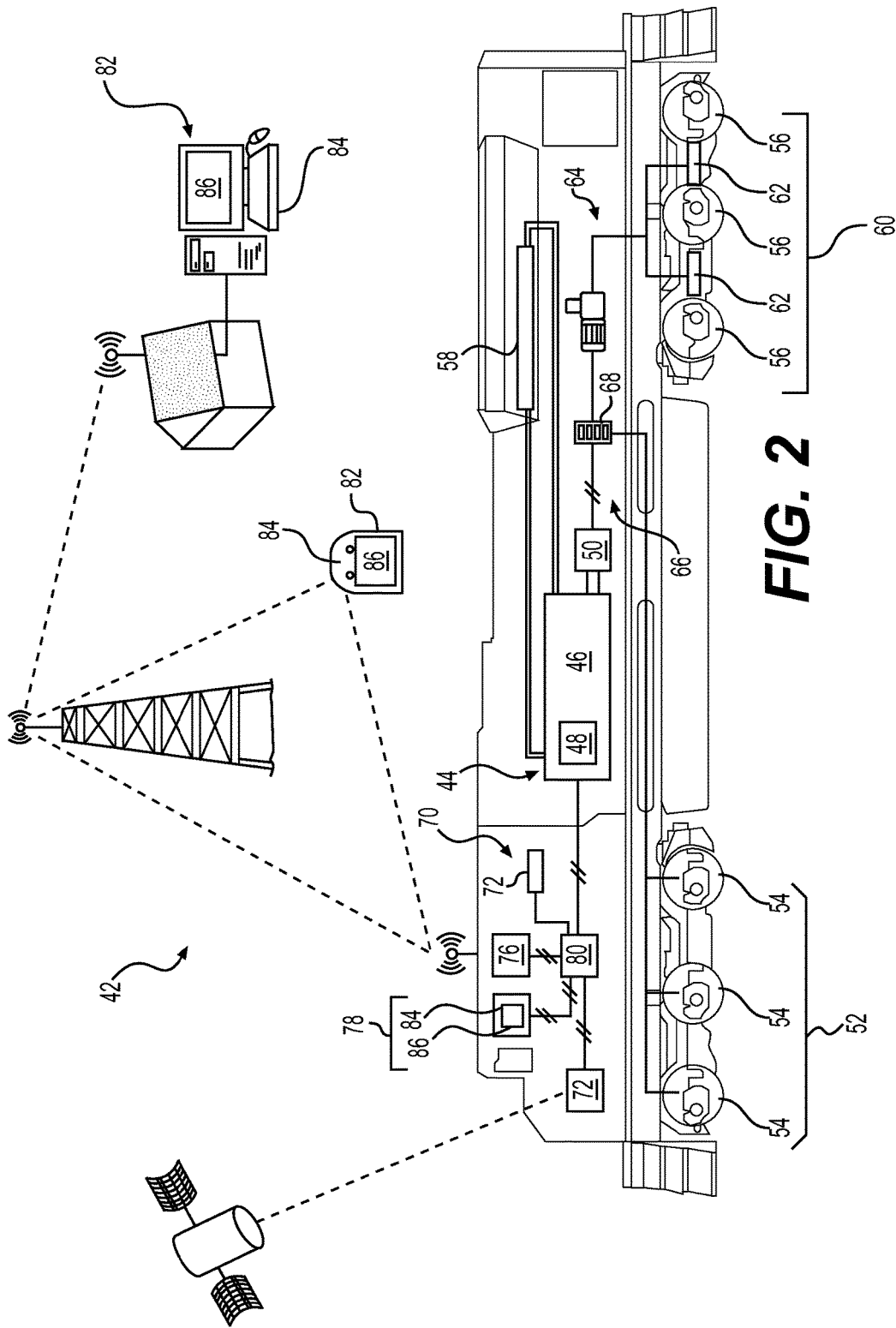
FIG. 2 is a schematic illustration of an exemplary disclosed locomotive that may operate on the railroad network of FIG. 1.

FIG. 2 shows an exemplary locomotive 18 that may be associated with train 14 (referring to FIG. 1) and a communication network 42 that may be used to transmit data and other information throughout railroad network 10. Locomotive 18 may be a fuel-burning locomotive that includes an engine system 44 having one or more fuel-burning engines 46 (only one shown in FIG. 2), Engine 46 may be an internal combustion engine (e.g., a piston engine, a turbine engine, etc.) configured to burn a fuel (e.g., diesel petrol, natural gas propane, kerosene, etc,) supplied by a fuel system 48 in order to generate a mechanical power output. The output of engine 46 may be used to drive a generator 50 (e.g., an AC generator, a DC generator, etc.) configured to supply electricity to a traction system 52 having one or more traction motors 54 for propelling locomotive 18 on a plurality of wheels 56 and axles (not shown). Engine 46 may alternatively be configured to directly drive wheels 56 with the mechanical output via drivetrain components, such as gears, clutches, torque converters, shafts, etc. In other embodiments, engine 46 may be a fuel-fired furnace (e.g., a coal furnace) configured to produce steam power for propelling locomotive 18. The power output of engine 46 and track speed of locomotive 18 attained via traction system 52 may be adjusted via a throttle by and controlled manually and/or by an automatic train operations (ATO) system.

A cooling system 58 may be configured to actively cool engine 46 and/or other components of locomotive 18 to maintain desired operating temperatures. Cooling system 58 may include, for example, fluid conduits and circulatory equipment (e.g., pumps, valves, reservoirs, fans, etc.) that circulate a cooling fluid (e.g., water, a coolant, etc.) between a heat source (e.g., such as engine 46, generator 50, etc) and a heat sink, such as a heat exchanger. In this way, cooling system 58 may help maintain the health of locomotive 18 during operation.

Locomotive 18 may also include one or more brake systems 60 (only one shown in FIG. 2) configured to reduce the track speed of locomotive 18. For example, brake systems 60 may include one or more braking devices 62 positioned near a rotary component (e.g., a brake disk, brake drum, etc.) associated with wheels 56. Braking devices 62 may include a calipers and pads, shoes and linkages, magnetic brakes (e.g., eddy current brakes), or another type of braking device. As shown in FIG. 2, braking devices 62 may be actuated by a compressed air system 64. In other embodiments, braking devices 62 may be powered hydraulically, mechanically, by a combination thereof, or by another method. Locomotive 18 may also or alternatively include other types of braking systems, such as parking brakes, auxiliary brakes, electronically controlled pneumatic brakes, etc. Brake systems 60 may be controlled manually by an operator or automatically by an ATO system.

An electrical system 66 may supply and/or control electrical power to various electrical devices associated with locomotive 18. Electrical system 66 may supply electrical power via generator 50, a dedicated engine and generator, one or more batteries or battery banks, a connection to grid power, or another source of electricity. Electrical power may be distributed throughout electrical system 66 via one or more circuit breakers 68 (only one shown in FIG. 2). For example, electricity from generator 50 may be distributed to traction motors 54 via circuit breaker 68 for propelling locomotive 18. Electrical system 66 may also power a locomotive control system 70 and/or other electronic control devices. Electrical system 66 may include additional circuit breakers 68, fuses, receptacles, lights (e.g., headlights, running lights, interior lights, etc.), and or other components, as desired.

Control system 70 may include one or more components associated with manual and/or automatic control of locomotive 18 and/or train 14. For example, control system 70 may include a plurality of sensors 72 (only one shown in FIG. 2), a locating device 74, a communication device 76, a user interface 78, and a controller 80 in communication with each of the other components. Controller 80 may also be in communication with and configured to selectively operate one or more actuators associated with the components of systems 44, 48, 52, 58, 60, 66, and 70. Additional and/or other components of control system 70 may be included, if desired. Components of control system 70 may be configured to communicate by wired (e.g., dedicated wire, local area network (LAN), controller are network (CAN), wide area network (WAN), etc.) and/or wireless connections (e.g., WiFi, Bluetooth, cellular, satellite, RFID, etc.). Although controller 80 is shown as being located within locomotive 18, it is understood that controller 80 may be located at any desirable location where it may be connected to communication network 42, such as yard 22, station 26, factory 28, port 30, management office 40, etc.

Sensors 72 may be positioned throughout locomotive 18 and or other assets 16 of train 14 (referring to FIG. 1). Sensors 72 may each be configured to generate a signal indicative of an operating parameter and/or an operational status of an associated system, subsystem, and/or component of locomotive 18. Sensors 72 may be configured to generate signals indicative of, for example, temperature (e.g., a coolant temperature, an oil temperature, etc.), pressure (e.g., an oil pressure, a coolant pressure, an intake air pressure, etc.), position, current, voltage, presence (e.g., via optical sensors, cameras, etc.), air flow, fuel flow, exhaust constituents, air/fuel ratio, light intensity, I/O status, etc. One or more of sensors 72 may be associated with each of systems 44, 48, 52, 58, 60, 66, and 70, and/or other systems, subsystems, and/or components of locomotive 18. Signals generated by sensors 72 may also be indicative of an operational stains of sensors 72 themselves and/or their associated systems, subsystems, and/or components. For example, the integrity, strength, and/or nature of the signals generated by sensors 72 may be indicative of whether the respective sensor and/or associated systems, subsystems, and/or components are functioning properly. Signals from sensors 72 may be communicated to controller 80 for further processing.

Locating device 74 may be an onboard locating device configured to determine and communicate an absolute and/or relative geographic location of locomotive 18. For example, locating device 74 may include a Global Positioning System (GPS) transponder configured to receive position signals from one or more GPS satellites, an Inertial Reference Unit (IRU), or any other locating device known in the art. Locating device 74 may communicate the positioning signals and/or other information to controller 80 for further processing.

Communication device 76 may include any device configured to facilitate communications between controller 80 and off-board entities 82. Communication device 76 may include hardware and/or software that enables communication device 76 to send and/or receive data messages through a wired and/or wireless communication link. Communication device 76 may be configured to communicate via wireless communication platforms, such as by satellite, cellular, infrared, Bluetooth, WiFi, and/or other wireless communication platforms. Communication device 76 may also or alternatively be configured to communicate via a local area network (LAN) or another type of wired network that enables controller 80 to exchange information with on- or off-board entities.

Off-board entities 82 may include any device associated with railroad network 10 and configured to communicate electronic data and other information. For example, off-board entities 82 may include or be associated with other trains 14, yards 22, depots 24, stations 26, factories 28, ports 30, wayside equipment 38, management offices 40, back office computers, mobile devices (e.g., cellular phones, tablets, laptop computers, etc.), and or other devices or locations that produce or consume information. Each off-board entity 82 may include communication hardware and/or software or be otherwise configured to receive, process, store, and/or transmit electronic data and/or other information.

User interface 78 may be located inside an operator station of locomotive 18, and may include a data entry module 84 configured to receive manually-entered data from an operator and a display 86 for displaying information to the operator. Data entry module 84 may include a keyboard, mouse, touchscreen, directional pad, selector buttons, or any other suitable features for recording manually entered data. In some embodiments, user interface 78 may also include one or more devices for controlling operations of locomotive 18 and/or train 14. For example, user interface 78 may include a throttle control (e.g., throttle notch control), a brake control (e.g., a brake handle), a reverses and/or other controls. Control devices may embody levers, knobs, switches, buttons, slides, handles, touch screens, soft keys, and/or other types of controls. User interface 78 may also be configured to allow the operator to engage or communicate with other control systems of train 14 and/or individual assets 16. That is, information and input requests from one or more other control systems may be shown to the operator via display 86, and the operator may provide responses and/or other input via data entry module 84. inputs entered via data entry module may be communicated to controller 80 for further processing.

In some embodiments, user interface 78 may also or alternatively be located off-board train 14. For example, user interface 78 may be associated with one or more off-board entities 82 or other type of electronic device or system. User interface 78 may include or be associated with communication hardware and/or software, enabling it to receive and/or send information via communication network 42.

Controller 80 may embody, for example, an electronic control module (ECM), or another processor that is capable of executing and/or or outputting control signals in response to received inputs. Controller 80 may include means for accessing, reading, and processing stored information and for displaying such information by way of user interface 78. For example, controller 80 may embody a single microprocessor or multiple microprocessors that include a means for monitoring input from user interface 78, sensors 72, and/or other sources. Controller 80 may include a memory, a secondary storage device, and a processor, such as a central processing unit or any other means for accomplishing a task consistent with the present disclosure. Commercially available microprocessors can be configured to perform the functions of controller 80. It should be appreciated that controller 80 could readily embody a general machine controller capable of controlling numerous other machine functions. Various other known circuits maybe associated with controller 80, including signal-conditioning circuitry, communication circuitry, and other appropriate circuitry.

Figure 3:
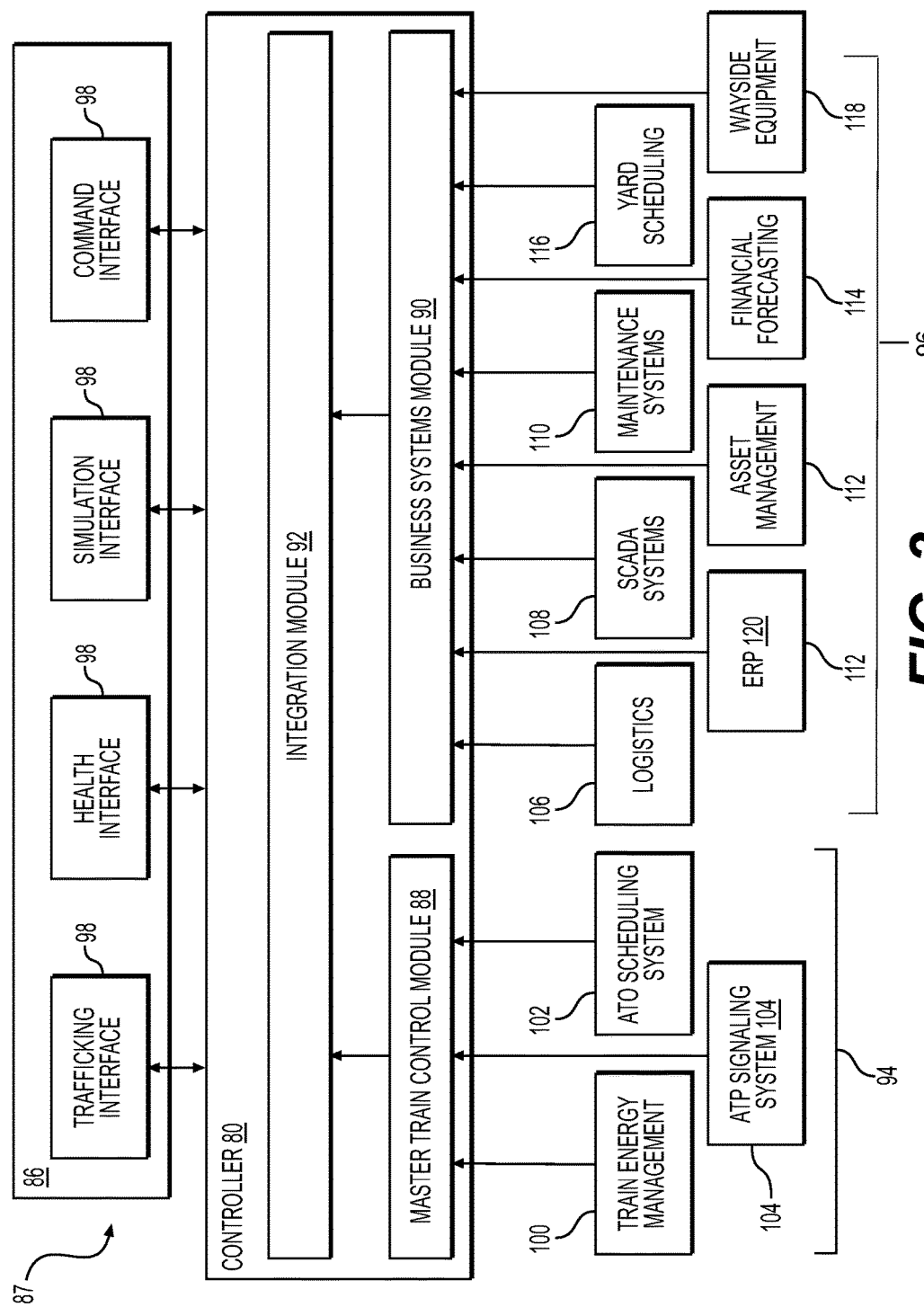
FIG. 3 is a diagrammatic illustration of an exemplary disclosed management system that may be used with the railroad network of FIG. 1.

FIG. 3 shows an exemplary railroad management system 87 that may include controller 80 and display 86. It is understood that railroad management system 87 may include other or additional components, as desired. Controller 80 may include a master train control module ("control module") 88, a business systems module 90, and an integration module 92 in communication with each of the other modules. Controller 80 may be configured to receive input signals from sensors 72 (shown only in FIG. 2), one or more train control systems 94, and one or more railroad data management systems ("date systems") 96 and display one or more graphical user interfaces 98 on display 86 of user interface 78 (shown only in FIG. 2) based at least in pan on the input signals. Graphical user interfaces 98 may be configured to display information to the user tor observing and/or controlling operations of railroad network 10.

Graphical user interfaces 98 may be configured to relay operational tools as well as information and data generated by control systems 94, data systems 96, and controller 80 to the user in various visual and/or interactive formats. Graphical user interfaces 98 may comprise or be associated with a dashboard platform configured to allow the user to selectively view various pieces of information, issue commands, run simulations, and/or perform other operational or supervisory tasks.

For example, graphical user interfaces 98 may display asset tracking information, including the location and status (e.g., running, failed, needs attention, etc.) of each asset 16 on railroad network 10. Asset tracking informatics may be shown in tables, lists, or maps or other formats conducive to presenting asset tracking information. Graphical user interfaces 98 may also display operating parameters and health information about each train 14 that may be used by operators to assess train conditions and formulate operational control strategies. Graphical user interfaces 98 may also include simulation interfaces configured to allow users initiate performance studies of train 14 based on data generated by control systems 94, data systems 96, and/or sensors 72.

Control module 88 may be configured to receive input data from one or more data sources and control operations of locomotive 18 (referring to FIG. 2) and/or other assets 16 (referring to FIG. 1) based at least in part on the input data. Control module 88 may receive input data from sensors 72 (shown only in FIG. 2) and train control systems 94 and generate command signals for controlling the operations of train 14 (referring to FIG. 1) based on the input data. That is, controller 80 may monitor operating parameters of assets 16 (as indicated by signals from sensors 72) and receive command signals or other information from train control systems 94 and generate control signals to actuate components of assets 16 in order to maintain the operating parameters at or within a range of set point and/or threshold values. Controller 80 may be configured to control actuators associated with operating parameters, such as, for example, engine speed, track speed, fuel pressure, coolant temperature, oil temperature, and/or other parameters.

Train control systems 94 may include one or more factory-original or third-party control systems configured to control or provide information relating to operational aspects of train 14 in conjunction with control module 88. For example, train control systems 94 may include a train energy management system ("energy management system") 100, an ATO scheduling system 102, an ATP signaling system 104, and or other types of control systems.

Energy management system 100 may include software or a combination of hardware and software in communication with control module 88 and configured to generate command signals to optimize control of train 14 under detected circumstances. Energy management system 100 may be configured to receive input signals from sensors 72, locating device 74, wayside equipment 38, and/or other inputs indicative of operating parameters of train 14 and generate output signals for achieving optimum control of train 14. For example, energy management system 100 may generate command signals for automatically controlling throttle, braking, and or other aspects of train 14 based on the current operating parameters, health condition, and/or location of train 14 in order to achieve optimum performance while accomplishing all mission goals and objectives. Mission goals and objectives may include achieving performance goals (e.g., performance levels, efficiency levels, etc.), adhering to schedules, and obeying laws.

ATO scheduling system 102 may coordinate various schedules associated with a mission and provide time and location goals to be achieved by energy management system 100 and control module 88. For example, ATO scheduling system nun- receive inputs indicative of delivery schedules, maintenance schedules for assets 16, personnel schedules (e.g., shifts, vacations, flight times, etc.), corporate and productions schedules (e.g., holidays, shutdowns, etc.), customer receiving schedules, and or other schedules. Based on these inputs, ATO scheduling system may determine when train 14 should arrive at certain locations in order to accomplish mission goals and provide time and location targets to energy management system 100 and/or control module 88. Energy management system 100 and/or control module 88 may use the time and location targets as inputs for controlling operations of train 14 in accordance with mission objectives and control strategies.

ATP signaling system 104 may be configured 10 generate movement data of train 14 and generate signals indicative of whether train 14 is operating within desired speed ranges and/or within its movement authority. For example, ATP signaling system 104 may be configured to detect the location, track speed, and or other movement data of train 14 via wayside equipment 38 and/or other sensory devices. Based on detected speed and location information, ATP signaling system 104 may determine other information about train 14, such as a distance from another location, a time until another location will be reached, a stopping distance, etc. ATP signaling system 104 may also generate signals indicative of movement authority, or whether train 14 has permission to use a particular stretch of rail, based on the locations of other trains 14 and/or track conditions (e.g., open, closed, under construction, etc.). ATP signaling system 104 may generate signals communicable to the operator via user interlace 78 (e.g., lights, sounds, etc.) or via wayside signaling devices (e.g., lights). Data from ATP signaling system 104 may be communicated to control module 88 and/or other train control systems 94 for use in manual and automatic control of train 14.

Data systems 96 may include one or more devices or systems configured to manually and/or automatically track, receive, and/or store data relating to operations of railroad network 10. Data systems 96 may be located onboard train 14 (e.g., in connection with 70) or off-board train 14 (e.g., in connection with yards 22, depots 24, stations 26, factories 28, ports 30, management offices 40, etc.). Data systems 96 may include computers, data storage devices, computer executable programs, electronic files or filing systems, spreadsheets, databases, servers, and or other devices or systems configured to collect, process, and/or store data.

For example, data systems 96 may include logistics systems 106 configured to track materials, personnel, equipment, and or other moving or movable aspects ox railroad network 10. For example, logistics systems 106 may track the location of payload materials throughout a delivery mission using any type of tracking technology, such as global positioning systems (GPS), radio frequency identification (RFID), barcode scanning, etc. Logistics systems 106 may be configured to store and maintain data relating to units of materials and/or personnel that are yet to be shipped, in transit, or have been shipped. Such data may include quantity information, origination and destination information, delivery dates, estimated time in transit, estimated time of arrival, size information, mode of transportation, shipping costs, carrier service information, etc. ft is understood that other or additional types of information and data may be gathered by logistics systems 106. 100401 Data systems 96 may also include SCADA systems 108 configured to carry out automated tasks within railroad network 10. SCADA systems 108 may include various types of industrial automated systems associated with transferring payload into and/or out of assets 16. For example, automated systems may include automatic payload dumping and filling systems for wagons 20. Automatic dumping systems may be configured to automatically position and index wagons before dumping their contents into a hopper and reconnecting the wagon 20 to the train 14; and automatic filling systems may automatically control the movements of wagons 20 through a filling station. Automated systems may also be configured to facilitate automated movement of assets from one area of a yard 22 to another according to yard rules, SCADA systems 108 may receive or detect information relevant to such automated processes, which may include, for example, payload statistics (e.g., weight, volume, quantity, size, type, etc.), numbers and types of assets in train 14, location information, and/or other information. It is understood that other or additional types of information and data may be gathered and other types of tasks may be performed by SCADA systems 108.

Data systems 96 may also include maintenance systems 110 configured to detect and store data relating to maintenance issues of trains 14, tracks 12, and or other aspects of railroad network 10. For example, maintenance systems 110 may work in connection with sensors 72 to monitor and record operational data of trains 14 and generate fault codes when operating parameters exceed threshold or limit values. Maintenance systems 110 may also monitor operating conditions of tracks 12 in connection with wayside equipment 38 and/or as indicated by performance data of trains 14 (e.g., wheel slip, vibrations, etc.). Fault codes may be correlated with other information, such as GPS location, train ID, etc., to help track fault codes for determining causation and particular aspects of trains 14 and/or tracks 12 that may require attention. Other data, such as track utilization statistics (e.g., age, number of assets supported, total weight supported, maximum weight supported, etc) may also be generated by maintenance systems 110. It is understood that other or additional types of information and data may be gathered by maintenance systems 110.

Data systems 96 may also include asset management systems 112 configured to track usage data of assets 16. For example, asset management systems 112 may track when each asset 16 goes into service, how long each asset has been in service, and when each asset is taken out of service. Asset management systems 112 may also track historic data of payload that has been handled by each asset (e.g., weight, volume, quantity, type, etc.). Data gathered by asset management systems 112 may also be correlated with positioning data (e.g., GPS data) to track the distance traveled by each asset 16 and the locations visited by each asset 16. It is understood that other or additional types of information and data may be gathered by asset management systems 112.

Data systems 96 may also include financial forecasting systems 114 configured to analyze and/or generate data relating to the effects of financial parameters on the operations of railroad network 10. For example, financial forecasting systems 114 may generate data pertaining to stock market behaviors of financial instruments relating to goods hauled on railroad network 10, consumer demand statistics, sales numbers, corporate earnings statements, related market trends (e.g., of fuel markets, of currency markets, of raw material markets, etc.), and/or other information. Financial forecasting systems 114 may also generate data relating to customer trends and habits, such as shipping volumes as a function of calendar date, weather patterns, cycle period (e.g., weekly trends, monthly trends, quarterly trends, etc.), etc. This information may be indicative of anticipated shipping volumes, and therefore indicative of potential asset requirements, manpower requirements, maintenance requirements, track usage, scheduling requirements, etc. It is understood that other or additional types of information and data may be gathered by financial forecasting systems 114.

Data systems 96 may also include yard scheduling systems 116 configured to organize and coordinate usage of resources within yards 22. For example, yard scheduling systems 116 may be configured to facilitate the allocation of siding space, material storage space, asset storage space, loading and unloading time, and/or other aspects of yard operations. Yard scheduling systems 116 may receive information, such as shipping schedules (e.g., incoming and outgoing), train information (e.g., number and type of assets 16, payload information, origination and destination information, etc.), layover time, train building information, and/or other information, and facilitate the allocation of time and space in and around yard 22 for carrying out loading and unloading tasks, as needed. It is understood that other or additional types of information and data may be gathered by yard scheduling systems 116.

Data systems 96 may also include wayside systems 118 configured to track operations of wayside equipment 38 and other information related to the usage of trains 14 and tracks 12. For example, wayside systems 118 may track information generated by wayside equipment 38, such as the condition and location of track components (e.g., rails, ballasts, ties, etc.) needing repair, a number of trains 14 or assets 16 that have traveled over certain stretches of tracks 12, traffic statistics, types of signals issued, and/or other information. Wayside systems 118 may also track the location of trains 14 and assets based on information detected by wayside equipment 38. It is understood that other or additional types of information and data may be gathered by wayside systems 118.

Data systems 96 may also include enterprise resource planning (ERP) systems 120 configured to track and/or aggregate information relating to business parameters and operational parameters associated with railroad network 10. For example, ERP systems may track inventories of pans, assets, payload, personnel, and or otter information at various locations throughout railroad network 10, and facilitate restocking of such inventories. ERP systems may track quantities, types, prices, availability, and/or other statistics for each stock item and allow a user to generate orders tor additional units of such items. Warehouse locations, estimated time of delivery, shipping information (e.g., cost, weight, size, special requirements, etc.) may be listed for each inventory item. Pending orders and associated information (e.g., estimated dates of delivery, shipping routes, origination and destination information, etc.) may also be listed. It is understood that other or additional types of information and data may be gathered and maintained by ERP systems 120.

Integration module 92 may be configured to aggregate the data received from both control module 88 and business systems module 90. Because control module 88 and business systems module 90 may receive common pieces of data among the many pieces of data received from multiple train control systems 94 and/or data systems 96, integration module 92 may be configured to identify each piece of data and integrate the common pieces of data to reduce or eliminate discrepancies in the data before using the data to generate graphical user interfaces 98. Common pieces of data may include, among other things, duplicative data (i.e., the same data generated by the same source hut received via a different control system or data system), redundant data (i.e., data of the same subject matter generated by different sources), categorically similar data (e.g., data that may or may not be independent and is of a type that could have a temporal or physical conflict—such as scheduling data, logistical data, etc.).

Integration module 92 may be configured to analyze the aggregated input data and identity discrepancies that may exist. For example, integration module 92 may be configured to compare redundant data (e.g., temperature data, weight data, counting data, current location data) and determine that a discrepancy exists when the comparison shows a difference between the data (e.g., a mathematical difference). In other situations, input data may not be mathematically comparable, and integration module 92 may be configured to compare the data to determine whether or not the pieces of data are identical. When input data, such as redundant data, is not identical, integration module 92 may be configured to determine that a discrepancy exists.

Integration module 92 may also be configured to analyze the aggregated input data and identify discrepancies based on certain analyses specific to a particular category of data. For example, integration module 92 may receive multiple units of scheduling data (e.g., date/time/location combinations) indicating where and when train 14 is expected to be according to a one or more control systems 94 or data systems 96. While it is expected that each unit of related data (i.e., each date/time/location grouping) should be different, discrepancies may exist in a physical, temporal, or practical sense, and integration module 92 may be configured to detect such discrepancies. That is, in one sense, integration module 92 may detect a discrepancy when two units of scheduling data include the same data and time but different respective locations (or vice versa), which would create a temporal and/or physical conflict for train 14. In another sense, integration module 92 may detect a discrepancy when the distance between two locations associated with units of scheduling data are too far for their difference in date and time. That is, integration module 92 may determine that an average speed needed to satisfy such a schedule may exceed the capabilities of train 14 or may require train 14 to travel at track speeds in excess of posted speed limits. Other types of discrepancies among the input data may be determined.

Integration module 92 may also detect discrepancies when data expected to be received is not received. That is, discrepancies detectable by integration module 92 may include instances in which certain pieces of input data are expected to be received but are partially or entirely missing. For example, controller 80 may be configured to determine or control certain operating parameters of train 14 based on receiving at least one input, while other operating parameters may be determined or controlled based on receiving and analyzing multiple inputs. When at least one input or a certain number of multiple inputs for determining or controlling certain operating parameters are not received, integration module 92 may determine that a discrepancy exists, as controller 80 may have insufficient or inadequate data to complete one or more of its operations with requisite accuracy or precision.

When discrepancies exist, integration module 92 may be configured generate corrected input data based on the input data from one or more train control systems 94 and data systems 96 to improve control and analysis of train 14 and/or railroad network 10. That is, integration module 92 may be configured to generate corrected input data and subsequently generate graphical user interfaces 98 based on the corrected input data in order to deliver higher quality information to the user. Integration module 92 may also be configured to return the corrected input data to other modules to allow for various aspects of train 14 and/or railroad network 10 to be controlled and/or observed based on consistent input data. Generating corrected input data may include selecting one or more pieces input data to represent a group of input data, combining pieces of data (e.g., mathematically, logically, etc.), or extrapolating data.

For example, integration module 92 may be configured to generate the corrected input data based on a selection of one of the common pieces of data identified during integration of the input data. In some embodiments, integration module 92 maybe configured to select one of the common pieces of data based on a hierarchy of the plurality of different train control systems 94 or data systems 96. That is, train control systems 94 and data systems 96 may be ranked, together or separately, in a hierarchy that may be predefined and stored within the memory of controller 80 or determined based on other factors. The hierarchy may indicate an order in which, integration module 92 may select a common piece of data to be representative of the group of common data. The hierarchy may be ordered based any desired factor, such as historical accuracy, the type of device used to gather the data, or another factor.

Integration module 92 may be configured to generate corrected input data based on a trust level associated with control systems 94 and data systems 96. For example, integration module 92 may be configured to assign a trust level to each of the plurality of different train control systems 94 or data systems 96 based on historic data (e.g., historic data comparisons, historic selections, historic accuracy determinations of input data, etc.). Integration module 92 may be configured to apply the trust level associated with each control systems 94 or data systems 96 to decisions pertaining to the generation of corrected data. For instance, selections of common data may be based solely or in part on the trust level associated with each piece of common data.

Integration module 92 may also be configured to generated corrected data based on the results of simulations that use common data as input variables. For example, controller 80 or integration module 92 may store one or more algorithms or models configured to produce data indicative of the performance of train 14 or railroad network 10 under certain conditions. Integration module 92 may be configured to access these algorithms or models and perform a series simulations using each of the common pieces of data and select one of the common pieces a of data based on results of the simulations. For instance, the common piece of data corresponding to the most favorable simulation results may be selected, which may represent the corrected input data or be used to generate the corrected input.

In some embodiments, the integration module 92 may be configured to generate corrected input data based on one or more models, such as a fuzzy logic model, a discrete choice model, or a neural network model. For example, controller 80 or integration module 92 may store a fuzzy logic model, and integration module 92 may access the fuzzy logic module to determine how to generate the corrected input data. The fuzzy logic model may include conditional logic rules that provide different outcomes based on the nature of the input data and the common pieces of data. Integration module 92 may be configured to then generate corrected input data based on the outcome of the logic rules. For example, the fuzzy logic model may indicate a piece of common data to be selected by integration module 92, or it may indicate that certain pieces of input data should be combined to arrive at the corrected input data. Similarly, a discrete choice model or neural network model may also or alternatively be stored in controller 80 or integration module 92 and accessed by integration module 92 to generate, based on the input data and/or common pieces of data, the corrected input data.

In some embodiments, integration module 92 may be configured to combine the common pieces of data and/or other data to generate the corrected input data. For example, integration module 92 may be configured to mathematically combine the common pieces of data to produce a representative piece of data for the common data. Mathematically combining data may include operations such as averaging, filtering, selecting a mean, median, or mode, applying algorithms, and/or implementing other operations. Algorithms tor combining data may be determined empirically or theoretically, as desired, and may include models and simulation (e.g., fuzzy logic models, discrete choice models, neural network models, etc.). Such algorithms may utilize various inputs, such as the common data and/or other input data (i.e., the combination results may depend on current operating parameters not included in the common data).

Integration module 92 may also be configured to combine the common and/or other input data based on other evaluations, such as the trust level of each control system 94 and data system 96 and/or model results. For instance, the trust level associated with each control system 94 and data system 96 may be applied to the data generated by each before the data is used in a combination procedure. In this way, the results of each combination procedure carried out by integration module 92 may be based on the trust level, associated with each piece of data, which may result in the common data having a higher associated trust level being more influential in the generation of corrected input data. The results of simulations and models (e.g., fuzzy logic models, discrete choice models, neural network, models, etc.) used to select representative common data may also be used as inputs in combination procedures. Alternatively, the combination procedure may itself be a simulation or model, as discussed above. The combined data may be returned to other modules or systems (e.g., control systems 94, data systems 96, etc.) for further processing and/or used by controller 80 to generate graphical user interfaces 98.

When integration module 92 determines that expected input data has not been received from train control systems 94 and data systems 96, integration module 92 may be configured to generate substitute input data that may be used in further processing. For example, integration module 92 may be configured to access a stored algorithm (e.g., a model, a simulation, etc.) configured to generate substitute data or extrapolate other data to produce substitute data. Inputs to such algorithms may include data indicative of current operating parameters, historic data, and/or default data stored within an associated memory device. The substitute data may be returned to other modules or systems (e.g., control systems 94, data systems 96, etc.) for further processing and/or used by controller 80 to generate graphical user interfaces 98.

One skilled in the an will realize that the processes illustrated in this description may be implemented in a variety of ways and include other modules, programs, applications, scripts, processes, threads, or code sections that -nay all functionally interrelate with each other to accomplish the individual tasks described above for each module, script, and daemon. For example, these modules may be implemented using commercially available software tools, using custom object-oriented code written in the C++ programming language, using applets written in the Java programming language, or may be implemented with discrete electrical components or as one or more hardwired application specific integrated circuits (ASIC) that are custom designed for this purpose. Other programming languages may be used as desired.

The described implementation may include a particular network configuration but embodiments of the present disclosure may be implemented in a variety of data communication network environments using software, hardware, or a combination of hardware and software to provide the processing functions.

Industrial Applicability

The disclosed railroad management system may be applicable to any railroad network, including subways, trolleys, and railroads. The disclosed railroad management system may present more accurate information to users regarding the operations of rail assets and/or railroad networks by integrating data from a plurality of monitoring and control systems. In particular, the disclosed railroad management system may integrate data from multiple sources to provide corrected data that may be returned to other areas of the management system to improve future data processing or to the user to provide additional and more accurate information for managing the network. The disclosed railroad management system may allow for more efficient railroad operations to be coordinated and carried out by manual or automatic procedures that depend on the data separately generated by the plurality of monitoring and control systems. An exemplary operation of the disclosed railroad management system will now be explained.

When a request for the shipment of payload materials from a first location (e.g., factory 28) to a second location (e.g., port 30) via railroad network 10 is submitted (e.g., by a customer, by railroad personnel, etc.), information may be supplied controller 80 in order to generate or update a railroad schedule. For example, controller 80 may receive information from logistics system 106 indicative of certain logistical information, such as a quantity of payload material to be delivered, a type of payload material to be delivered, a type of packaging the payload material will be contained in, when the payload material will be available for pickup, a requested delivery deadline, and whether any other orders are scheduled for delivery to the same destination at or around the same time. Controller 80 may also receive information from ERP system 120, such as whether any other orders for the same material have been placed and not yet scheduled, whether any reserves of payload material at factory 28 are sufficiently stocked to fill the request right away or when factory 28 is expected to fill the request.

Integration module 92 may then compare each piece of data received by controller 80 to determine whether there are any discrepancies. For example, if the amount of ordered payload material is less than the amount of payload material in reserve, integration module 92 may detect an error. Integration module 92 may then integrate this information with the expected time for factory 28 to fill the request, and if the expected time surpasses a latest possible date to begin the mission without missing the delivery deadline, integration module 92 may detect another discrepancy. If the amount of reserved payload material can be supplemented by factory 28 before the latest permissible departure date, integration module 92 may not detect a discrepancy. Integration module 92 may then correct the expected date and time of delivery at the second location based on the integrated data, and display the corrected information to the user on graphical user interface 98 via display 86.

A route from the first location to the second location may then be selected, and controller 80 may receive further information about the route. For example, controller 80 may receive information from maintenance systems 110 and/or ATP signaling system 104, such as which spans of tracks 12 are open, which spans are closed, which spans are under repair (and their associated repair schedule), and any speed limits or other restrictions associated with each span. Integration module 92 may then integrate this information with the other information received by controller 80 to determine whether there are any discrepancies relating to the route selection. For example, it based on the distance between the first and second locations and the associated speed limits of the selected route, it would not be possible to reach the second location by the delivery deadline, integration module 92 may detect a discrepancy. Or if track closures or maintenance would prevent the mission from being accomplished on time, integration module may detect a discrepancy. Integration module 92 may then correct the date and time of expected delivery and controller 80 may provide the updated information to the user via display 86. The user may then select a different route to remedy the discrepancy, if desired, and integration module 92 may update the expected date and time of delivery.

Controller 80 may also receive information regarding the loading of wagons 20 with payload material at yard 22. For example, controller may receive data from logistics systems 106 and/or ERP system 120 indicative of how much material is to be shipped, and how many wagons 20 may be needed to carry the specified amount of material. Controller 80 may also receive data from yard scheduling system 116 and or asset management system 112 indicative of how many wagons are available for use at yard 22. If asset management system 112 indicates that too few wagons 20 are available while yard scheduling system 116 indicates that plenty of wagons 20 are available, integration module 92 may detect a discrepancy and integrate the data to determine a corrected number of available wagons for purposes of continuing the planning process. If yard scheduling system 116 has a higher trust level or a more senior hierarchical position than asset management position with respect to this particular piece of data, then integration module 92 may select the data generated by yard scheduling system 116 and correct the number of available wagons 20 at yard 22 based on this selection.

Integration module 92 may also integrate the data from one or more data sources with historic data to generate a corrected data where data has not been provided or is incomplete. For example, when the number of wagons needed to fulfill the deliver request has not been provided by logistics systems 106 and/or ERP system 120, integration module may detect a discrepancy and generate replacement data to make up for the missing or incomplete data. In such a case, integration module 92 may first compare historic delivery quantities and historic numbers of used wagons 20 with the information received from logistics systems 106 and/or ERP system 120 (e.g., the amount of payload material to be delivered). Based on the historic numbers of wagons 20 used to deliver similar quantities of payload material, integration module 92 may then determine an expected number of wagons 20 needed to complete the delivery based on the historic data. This number of wagons 20 may then be displayed in a graphical user interface 98 via display 86 to the user. In this way, more information may be provided to the user than may have otherwise been available, allowing the user to make more informed decisions moving forward.

Controller 80 may also receive information from financial forecasting system 114, which may be indicative of whether or not additional assets and/or personnel should be secured for future needs. For example, ERP system 120 and/or logistics system 106 may generate data indicative of additional or future orders, and a number of wagons 20 required to complete the deliveries may be determined and input to controller 80. Integration module 92 may compare the number of needed wagons 20 to the corrected number of available wagons 20 and may not detect a discrepancy when the number of available wagons is sufficient to support future order. But data generated by financial forecasting system 114 and received by controller 80 may be indicative of increased market demand and increased production at factory 28, which may be indicative of an increase in future delivery requests. For instance, financial forecasting system 114 may generate data indicative of a number of anticipated delivery orders and/or an anticipated number of wagons 20 needed to fulfill future delivery orders, and integration module 92 may detect a discrepancy when the anticipated number of wagons for future orders is not satisfied by the number of available wagons 20 at yard 22. Integration module may then integrate the data received by controller 80 and correct how many more wagons 20 are anticipated to be needed at yard 22 in excess of the number of available wagons 20 and display the corrected number of needed wagons 20 in a graphical user interlace 98 via display 86.

In addition to updating graphical user interfaces 98 with the corrected data, integration module 92 may also continually return the corrected data to control module 88 and business systems module 90. In this way, corrected information may be available for use in operational determinations and control of train 14. For example, train energy management system 100 may determine the most efficient way of operating train 14 based on a selected route, a selected delivery deadline, applicable speed limits, the total payload weight and number of wagons 20 of train 14, and the health and operating conditions of each asset 16. And when integration module 92 returns corrected data (e.g., corrected route, corrected speed limit, corrected delivery date/time, etc.) that affects the outcome of determinations made by energy management system 100. control module 88 maybe allowed to update energy management system 100 or modify the automatic operations of train 14 based on the corrected data. In this way, integrated data may be continually provided to automatic train control systems for maintaining high efficiency and mission success.

Several advantages may be realized by the implementation of railroad management system 87. By using railroad management system 87, railroad managers and train operators may be provided with a management system capable of aggregating and integrating numerous pieces of data generated by several data sources. Because railroad management system 87 may be able to integrate data from several different data sources, discrepancies in data presented to managers and operators may be detected and reduced or eliminated. Further, because railroad management system 87 may integrate data from numerous sources, voids in data collection or missing data from any particular source may be at least partially resolved using integrated data received from the other sources. In this way, using railroad management system 87 may allow managers and operators to more effectively monitor numerous aspects of a railroad network, and operations relying on data from numerous sources may be provided with additional and/or more accurate data.

It will be apparent to those skilled in the art that various modifications and variations can be made to the management system of the present disclosure. Other embodiments of the management system will be apparent to those skilled in the art from consideration of the specification and practice of the management system disclosed herein. It is intended that the specification and examples be considered as exemplary only, with a true scope of the disclosure being indicated by the following claims and their equivalents.

What is claimed is:

1. A railroad management system, comprising:
    a display device configured to display information to an operator; and
    a controller in electronic communication with display device and including:
        a train control module configured to receive input data from one or more train control systems and generate command signals for controlling operations of a train based on the input data from the one or more train control systems;
        a business systems module configured to receive input data from one or more railroad data management systems; and
        an integration module configured to:
            identify discrepancies among the input data from the one or more train control systems and the railroad data management systems; and
            generate corrected input data based on the input data from the one or more train control systems and the railroad data management systems;
        wherein the controller is configured to display one or more graphical user interfaces on the display device based at least in part on the corrected input data.

2. The railroad management system of claim 1, wherein the one or more train controls systems include one or more of an energy management system associated with a train, an automatic train protection signaling system, and an automatic train operating system.

3. The railroad management system of claim 1. wherein the one or more railroad data management systems include one or more of a logistics system, an enterprise resource planning system, an asset management system, a supervisory control and data acquisition system, a maintenance system, a financial forecasting system, a yard scheduling system, and a wayside equipment system.

4. The railroad management system of claim 1, wherein the integration module is configured to:
    identify common pieces of data received from a plurality of different train control systems of railroad data management systems;
    identify discrepancies among the common pieces of data based on a comparison of the common pieces of data.

5. The railroad management system of claim 4, wherein the integration module is configured to:
    select one of the common pieces of data based on a hierarchy of the plurality of different train control systems or railroad data management systems; and
    generate the corrected input data based on the selected one of the common pieces of data.

6. The railroad management system of claim 4, wherein the integration module is configured to:
    perform simulations using each of the common pieces of data and select one of the common pieces of data based on results of the simulations; and
    generate the corrected input data based on the selected one of the common pieces of data.

7. The railroad management system of claim 4, wherein the integration module is configured to:
    select one of the common pieces of data based on one or more of a fuzzy logic model, a discrete choice model, or a neural network model; and
    generate the corrected input data based on the selected one of the common pieces of data.

8. The railroad management system of claim 4, wherein the integration module is configured to combine the common pieces of data to generate the corrected input data.

9. The railroad management system of claim 4, wherein the integration module is configured to;
    assign a trust level to each of the plurality of different train control systems or railroad data management systems based on historic data; and
    generate the corrected input data based in part on the trust level of each of the plurality of different train control systems or railroad data management.

10. The railroad management system of claim 1, wherein:
    the integration module is configured to;
        determine when expected input data is not received from the one or more train control systems and the railroad data management systems; and
        generate substitute input data based on a model, wherein inputs to the model include one or more of historic data and default data; and
    the controller is configured to display the one or more graphical user interfaces on the display device based at least in part on the substitute input data.

11. A method of managing a railroad network, comprising;
    receiving input data from one or more train control systems;

receiving input data from one or more railroad data management systems;
identifying discrepancies among the input data from the one or more train control systems and the railroad data management systems;
generating corrected input data based on the input data from the one or more train control systems and the railroad data management systems; and
displaying one or more graphical user interfaces on a display device based at least in part on the corrected input data.

12. The method of claim 11, wherein:
the one or more train control systems includes one or more of an energy management system associated with a train, an automatic train protection signaling system, and an automatic train operating system; and
the railroad data management systems include one or more of a logistics system, an enterprise resource planning system, an asset management system, a supervisory control and data acquisition system, a maintenance system, a financial forecasting system, a yard scheduling system, and a wayside equipment system.

13. The method of claim 11, further including:
identifying common pieces of data received from a plurality of different train control systems or railroad data management systems;
identifying discrepancies among the common pieces of data bayed on a comparison of the common pieces of data.

14. The method of claim 13, further including:
selecting one of the common pieces of data based on a hierarchy of the plurality of different train control systems or railroad data management systems; and
generating the corrected input data based on the selected one of the common pieces data.

15. The method of claim 13, further including:
performing simulations using each of the common pieces of data:
selecting one of the common pieces of data based on results of the simulations; and
generating the corrected input data based on the selected one of the common pieces of data.

16. The method of claim 13, further including:
selecting one of the common pieces of data based on one or more of a fuzzy logic model, a discrete choice model, and a neural network model; and
generating the corrected input data based on the selected one of the common pieces of data.

17. The method of claim 13, further including combine the common pieces of data to generate the corrected input data.

18. The method of claim 13, further including;
assigning a trust level to each of the plurality of different train control systems or railroad data management systems based on historic data; and
generating the corrected input data based in part on the trust level of each of the plurality of different train control systems or railroad data management systems.

19. The method of claim 11, further including:
determining when expected input data is not received from the one or more train control systems and the railroad data management systems; and
generating substitute input data based on a model, wherein inputs to the model include one or more of historic data and default data; and
displaying the one or more graphical user interfaces on the display device based at least in part on the substitute input data.

20. A railroad management system, comprising;
a display device configured to display information to an operator; and
a controller in electronic communication with the display device and including:
a train control module configured to receive input data from one or more train control systems and generate command signals for controlling operations of a train based on the input data from the one or more train control systems;
a business systems module configured to receive input data from one or more railroad data management systems; and
an integration module configured to:
identify common pieces of data received by a plurality of different train control systems or railroad data management systems;
identify discrepancies among the common pieces of data based on a comparison of the common pieces of data; and
select one of the common pieces of data or combine the common pieces of data to generate corrected input data;
wherein the controller is configured to display one or more graphical user interfaces on the display device based at least in part on the corrected input data.

* * * * *